(12) United States Patent
Horiuchi

(10) Patent No.: US 6,367,833 B1
(45) Date of Patent: Apr. 9, 2002

(54) AUTOMATIC SHIFTING CONTROL DEVICE FOR A BICYCLE

(75) Inventor: Noriyuki Horiuchi, Higashiosaka (JP)

(73) Assignee: Shimano, Inc. (JP)

( * ) Notice: Subject to any disclaimer, the term of this patent is extended or adjusted under 35 U.S.C. 154(b) by 0 days.

(21) Appl. No.: 09/660,770

(22) Filed: Sep. 13, 2000

(51) Int. Cl.$^7$ .............................................. B62M 1/02
(52) U.S. Cl. ........................ 280/260; 701/55; 474/69
(58) Field of Search .................. 280/238, 259, 280/260, 261; 701/55; 474/69, 70, 71, 78, 110

(56) References Cited

U.S. PATENT DOCUMENTS

| | | | |
|---|---|---|---|
| 5,059,158 A | | 10/1991 | Bellio et al. |
| 5,213,548 A | * | 5/1993 | Colbert et al. ............... 280/238 |
| 5,261,858 A | * | 11/1993 | Browning ..................... 474/69 |
| 5,266,065 A | | 11/1993 | Ancarani Restelli |
| 5,356,348 A | | 10/1994 | Bellio et al. |
| 5,538,477 A | | 7/1996 | Bellio et al. |
| 5,728,017 A | | 3/1998 | Bellio et al. |
| 5,865,454 A | | 2/1999 | Campagnolo |
| 6,015,159 A | * | 1/2000 | Matsuo ........................ 280/260 |
| 6,047,230 A | * | 4/2000 | Spencer et al. ............... 474/78 |
| 6,073,061 A | * | 6/2000 | Kimura ....................... 280/260 |
| 6,146,297 A | * | 11/2000 | Kimura ....................... 280/238 |
| 6,204,775 B1 | * | 3/2001 | Kubacsi .................. 340/825.72 |

FOREIGN PATENT DOCUMENTS

| | | |
|---|---|---|
| EP | 0 899 188 | 3/1999 |
| JP | 8026170 | 1/1996 |
| JP | 8113181 | 5/1996 |
| JP | 8113182 | 5/1996 |
| JP | 8113183 | 5/1996 |

* cited by examiner

Primary Examiner—Daniel G. DePumpo
(74) Attorney, Agent, or Firm—Knobbe, Martens, Olson & Bear, LLP

(57) ABSTRACT

A bicycle features an automatically shifting transmission. The shifting is controlled by a controller. The controller has a number of ranges that comprise a subset of the available gear steps. The operator of the bicycle can select an appropriate range and the controller shifts gears within the range depending upon a preset map of bicycle speeds and gear steps. The operator can select other ranges as desired by upshifting or downshifting. The controller also has at least one cruising mode that decreases the likelihood of inadvertent shifting during operation of the bicycle at speeds within a preset range of speeds. In addition, the controller has an elapse mode that further reduces the number of available gear steps in a range during resumed operation after slowing below a preset speed or stopping.

22 Claims, 5 Drawing Sheets

AUTOMATIC SHIFTING CONTROL DEVICE FOR A BICYCLE

BACKGROUND OF THE INVENTION

1. Field of the Invention

The present invention generally relates to automatically shifting transmissions for bicycles. More specifically, the present invention relates to strategies for controlling the shifting patterns in such transmissions.

2. Related Art

In recent years, bicycles have begun to incorporate automatic transmissions. The automatic transmissions can be either mechanical or electronic in configuration. In the mechanical type transmissions, centrifugal forces are used to change between gears of the transmission. In electronic type transmission, certain operating characteristics can be sensed and used to signal a desired change between gears. Some of the electronic type transmissions sense operating speed of the bicycle to indicate that a gear change is desired.

The automatic transmissions can be used on bicycles featuring increasing numbers of gear steps through which the transmission can operate. For instance, in bicycles featuring a chain drive with a front sprocket set and a rear sprocket set, the rear sprocket set can comprise ten or more gear steps while the front sprocket can comprise three or more gear steps. The increase in numbers of available gear steps allows a rider to select an appropriate gear combination for any particular riding condition. In addition, when riding a manual transmission bicycle (or in a manual mode), the rider can skip intermediate gears to provide a comfortable shifting pattern.

SUMMARY OF THE INVENTION

The large number of available gears, however, causes problems with automatic transmissions. As the rider rapidly increases the speed of the bicycle, the automatic transmission may begin stepping through the gears in rapid succession. It has been found that rapid shifting can be aggravating to the rider. In addition, the lower most gears may not be desired for ordinary use by the rider. Moreover, due to the large number of available gears, the transmission will change gears according to a schedule having very small speed ranges between gear shifts. Thus, the rider may experience shifting even though they are attempting to maintain a steady pace.

Thus, an automatic transmission control system for a bicycle is desired that allows the range of gears to be selected by the rider. The system should automatically change gears within the transmission among a preset range of gears. The rider should be able to change the preset range of gears as desired. The transmission, therefore, will change gears less often and can be adapted for particular riding conditions. As a result of having less gear steps available, the speed ranges associated with each gear step will be enlarged to decrease the likelihood of undesired shifting. To further decrease the likelihood of such gear changes, the system should be able to recalibrate the shifting schedule after the rider has achieved a relatively steady pace. Finally, the transmission should be able to detect a rapid deceleration and accommodate the downshifting through the gears by reducing the number of gears within the preset range.

Accordingly, one aspect of the present invention involves a control arrangement for a bicycle transmission capable of automatic shifting. The arrangement comprises a transmission having a first set of gear steps and a shift controller that is adapted to move the transmission between each of the first set of gear steps. A control unit is electrically connected to the shift controller. The control unit is adapted to selectively operate the shift controller in an automatic mode using a second set of gear steps selected from the first set of gear steps. The second set of gear steps comprises at least one less gear step than the first set of gear steps. The control unit automatically actuates the shift controller to move the transmission between at least two steps of the second set of gear steps depending upon a sensed operating speed of the bicycle.

Another aspect of the present invention involves a method of controlling shifting in a bicycle transmission capable of automatic shifting. The method comprises sensing an operating speed of the bicycle, monitoring a period of time between transmission shifts, determining when a preset period of time between transmission shifts has elapsed and recalibrating an upper speed value and a lower speed value for a gear step currently in use.

A further aspect of the present invention involves another method of controlling shifting in a bicycle transmission capable of automatic shifting. The method comprises sensing, an operating speed of the bicycle, automatically changing gears within a first preset range of gear steps depending upon the operating speed of the bicycle, determining if the operating speed is rapidly reduced below a first threshold operating speed, switching to a second preset range of gear steps when the operating speed is rapidly reduced below the first threshold operating speed, automatically changing gears within the second preset range of gear steps depending upon the operating speed of the bicycle, and the first preset range of gear steps comprising more gear steps than the second preset range of gear steps.

Another aspect of the present invention involves a method of controlling shifting in a bicycle transmission capable of automatic shifting. The method comprising selecting an automatic operating mode, selecting a first preset range of gear steps from a plurality of preset ranges of gear steps, and operating the bicycle transmission among the selected preset range of gear steps.

A further aspect of the present invention involves a bicycle having a transmission capable of automatic shifting. The bicycle comprising a frame, a front wheel rotatably connected to the frame and a rear wheel rotatably connected to the frame. A crank is connected to the frame. A transmission drivingly connects the crank and the rear wheel. A speed sensor is connected to at least one of the front wheel and the rear wheel. A control unit is electrically connected to the speed sensor. A first shift switch and a second shift switch are electrically connected to the control unit. A shift actuator is operably connected to the control unit and to the transmission and is adapted to shift the transmission through a set of gears. The control unit comprises a memory of a first selected set of gears and corresponding shifting speeds, a second selected set of gears and corresponding shifting speeds, and a third selected set of gears and shifting speeds. The first selected set of gears and the second selected set of gears overlap and the second selected set of gears and the third selected set of gears overlap.

BRIEF DESCRIPTION OF THE DRAWINGS

These and other features, aspects and advantages of the present invention will now be described with reference to the drawings of a preferred embodiment, which embodiment is intended to illustrate and not to limit the invention, and in which figures.

DETAILED DESCRIPTION OF THE PREFERRED EMBODIMENTS OF THE INVENTION

Figure 1:
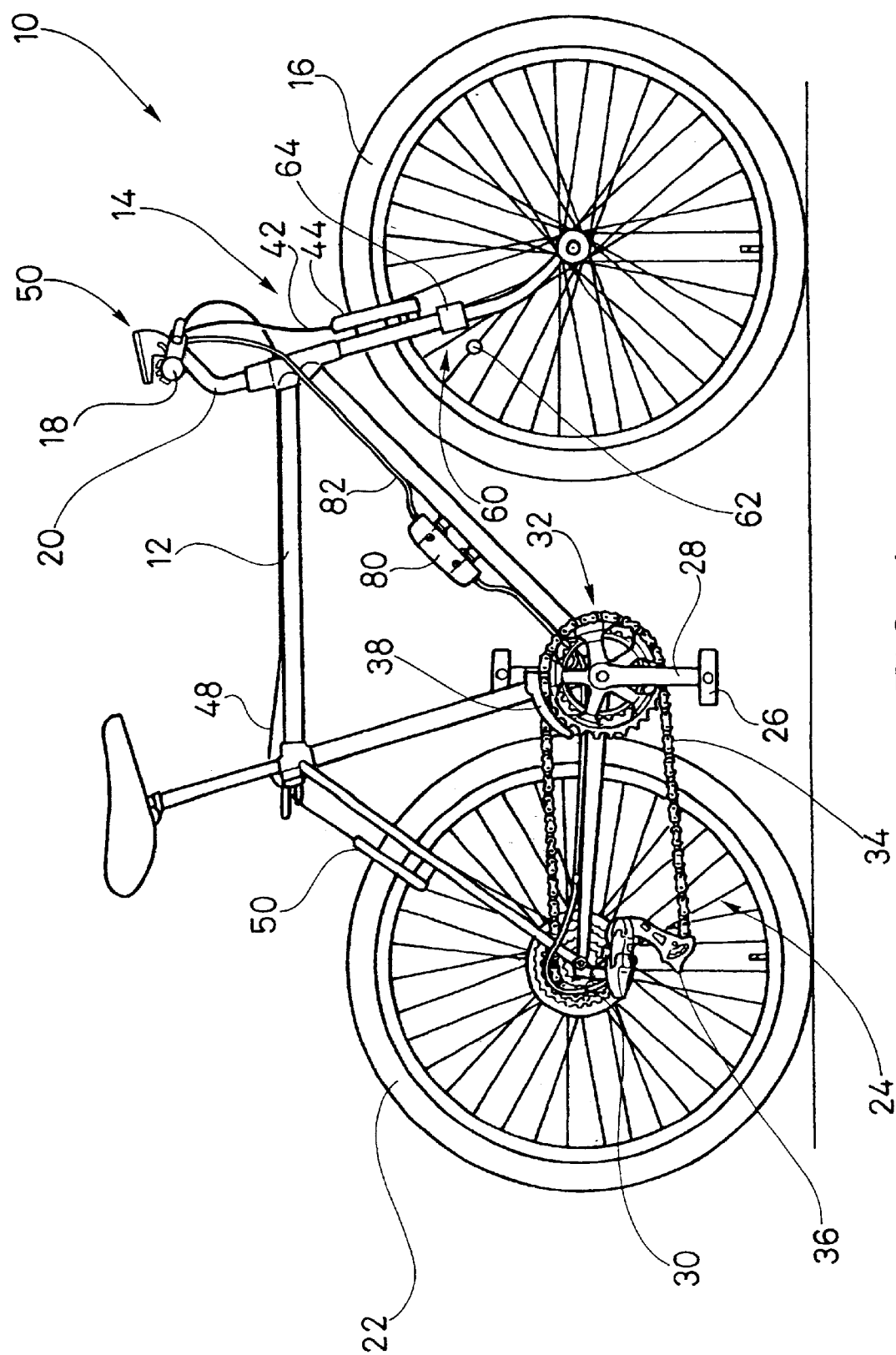
FIG. 1 is a side elevation view of a bicycle having an automatic shifting control device arranged and configured in accordance with the present invention.

With reference now to FIG. 1, a bicycle is illustrated therein. The bicycle is identified by the reference numeral 10. The illustrated bicycle 10 will provide an exemplary environment in which the present invention can be used. Of course, there are many other types of bicycles and other human-powered vehicles with which certain features, aspects and advantages of the present invention can be used. Accordingly, while the present control device and system will be described in the context of the illustrated bicycle, it should be understood that various features, aspects and advantages of the present device and system also can be used in other environments.

The illustrated bicycle 10 comprises a welded-up frame assembly 12, such as those well-known in the art. A front fork and handle bar assembly 14 is pivotally mounted to a forward portion of the frame assembly 12. A front wheel 16 is rotatably supported within the front fork and handle bar assembly 14. The front wheel 16 can be steered through a set of handle bars 18 in any suitable manner.

Figure 2:
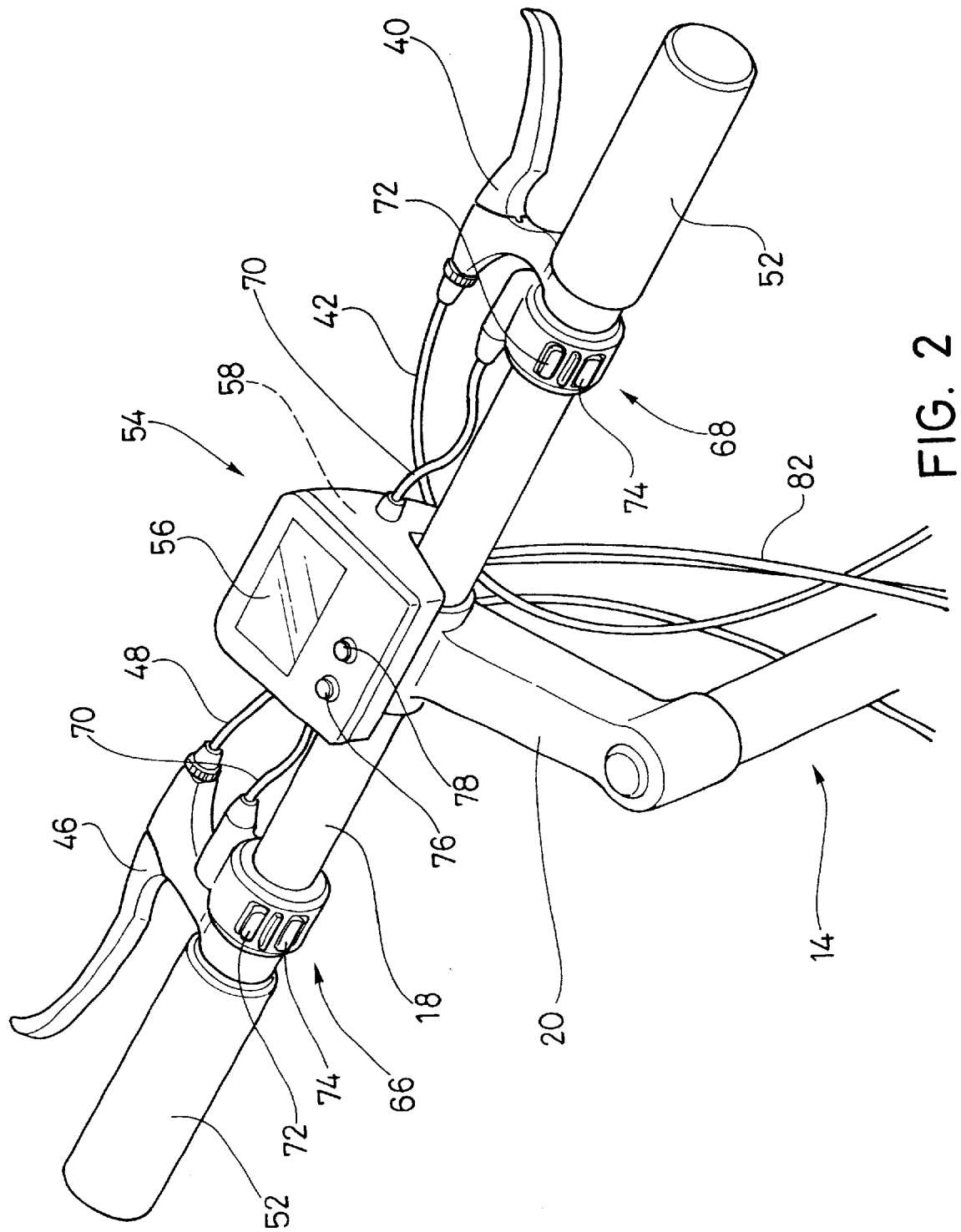
FIG. 2 is an enlarged perspective view of a handlebar region of the bicycle of FIG. 1.
Figure 3:
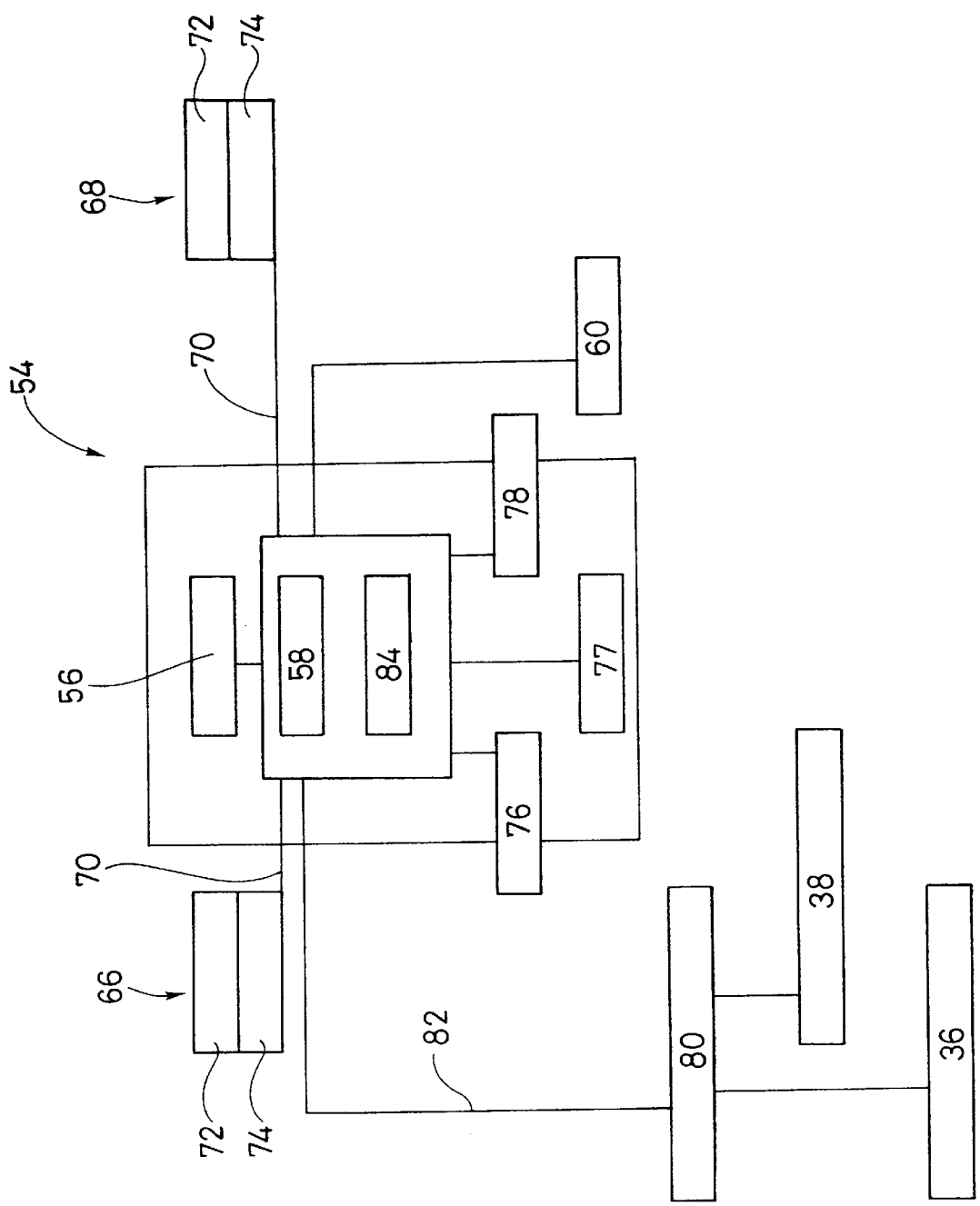
FIG. 3 is a schematic diagram of an automatic shifting control device having certain features, aspects and advantages in accordance with the present invention.

With reference to FIG. 2, the handle bars 18 preferably are mounted to the remainder of the front fork and handle bar assembly 14 at a handle bar stem 20. While the illustrated handle bars 18 are generally straight, other curved handle bars also can be used with the present invention. For instance, the handle bars 18 can bend upward and forward, upward and rearward, downward and forward or downward and rearward.

A rear wheel 22 also is rotatably mounted to the frame assembly 12. The rear wheel can be powered through a suitable transmission 24 by power input through a set of pedals 26 mounted to associated crank arms 28. The suitable transmission 24 can be a chain drive or a shaft drive. The transmission should include a change speed feature in which the transmission 24 can be shifted through a variety of gear steps. Such transmissions are well known in the art and can include external arrangements (i.e., sprockets) and internal arrangements (i.e., internal gear hubs).

In the illustrated arrangement, a rear sprocket set 30 is mounted to the rear wheel. The rear sprocket set 30 can include a number of gear steps that are defined by varied tooth numbers. In one configuration, the rear sprocket set 30 can include three gear steps. In another configuration, the rear sprocket can include eight gear steps and the tooth numbers can vary from 11 to 33. Any number of gear steps can be used. The gear steps will be described below in more detail. The illustrated arrangement also features a front sprocket set 32. In some arrangements, a single front sprocket can be used. In other arrangements, a dual front sprocket can be used. A presently preferred arrangement includes a duel front sprocket featuring 34 and 46 teeth. The front sprocket set 32 and the rear sprocket set 30 are connected with a chain 34 in the illustrated arrangement.

Shifting of the illustrated transmission 24 is accomplished using actuator controlled derailleurs. A rear shifting device 36 is used to shift among the gear steps on the rear sprocket set 30 and a front shifting device 38 is used to shift between the gear steps on the front sprocket set 32. The shifting devices 36, 38 can comprise a motorized actuator or a solenoid-type actuator. Both of such devices 36, 38 are known by those of ordinary skill in the art. The actuators move the associated derailleur from gear step to gear step as desired. A position sensor can be associated with each device 36, 38 to monitor the position of the derailleur. The control of these actuators will be discussed in more detail below.

The illustrated bicycle also features standard front brakes and rear brakes. As is known, a brake lever 40 can be operated to pull a wire of a bowden-wire type of cable 42. As the wire is pulled, the brakes are applied. In the illustrated arrangement, a clamping action about the front rim occurs at a front brake caliper 44. A similar arrangement also is used for the rear wheel wherein a rear brake lever 46 is used to manipulate a cable 48 and a rear brake caliper 50. As illustrated in FIG. 2, the levers 40, 46 preferably are mounted proximate hand grips 52 formed on the handle bars 18.

With continued reference to FIG. 2, a control unit housing 54 is mounted to the bicycle 10. Preferably, the control unit housing 54 is mounted to either the frame assembly 12 or the front fork and handle bar assembly 14. In the illustrated arrangement, the control unit housing 54 is mounted proximate the stem 20 and the handle bars 18.

A number of components preferably are mounted within the control unit housing 54. For instance, in the illustrated arrangement, a display screen 56 is provided. The display screen 56 can be used to display various operating parameters of the bicycle 10 and the associated transmission 24. For instance, in some arrangements, the display screen 56 can display which shifting mode has been selected (i.e., automatic or manual), whether a cruising mode has begun and other operating conditions. In other arrangements, the display screen can provide visual confirmation of speed, pedal torque or the like.

The illustrated control unit housing 54 also encases a central processing unit (CPU) or other type of controller 58. The controller 58 in the illustrated arrangement is electrically connected to a variety of input devices and output devices. For instance, the controller 58 is electrically connected to a speed sensor 60 that is disposed to detect an operating speed of the bicycle 10. In the illustrated arrangement, the speed sensor 60 is mounted to the front fork assembly 14 proximate the front wheel 16; however, other locations, such as proximate the rear wheel 18, for example but without limitation, also can be used. The speed sensor 60 in the illustrated arrangement comprises an emitter and detector or a magnet 62 and a detector 64. Other suitable arrangements also can be used.

With reference to FIG. 2, the illustrated controller 58 also can be electrically connected to a first shift switch 66 and a second shift switch 68. While the illustrated arrangement features a first shift switch 66 on a left side of the illustrated handle bars 18 and a second shift switch 68 on a right side of the illustrated handle bars 18, the positioning of the switches 66, 68 can be varied. For instance, the switches can be reversed, moved to a different region of the handle bars 18 or moved to a different region of the frame assembly 12 altogether. In the illustrated arrangement, the switches 66, 68 are directly electrically connected to the controller through a set of wires 70 (i.e., hard wired), it is anticipated that other types of electrical connections (i.e., infrared, radio waves, etc.) also can be used.

With continued reference to FIG. 2, the illustrated switches 66, 68 each comprise a pair of contact pads 72, 74. The pair of contact pads 72, 74 can be used to generate a first signal and a second signal. In the illustrated arrangement, the first contact pad 72 can be used to generate an up-shift signal while the second contact pad 74 can be used to generate a down-shift signal. Of course, these signals can be interchanged. Also, while the illustrated arrangement uses a pair of contact pads 72, 74, other arrangements can use three-position switches, toggle switches or other suitable switches.

In the illustrated arrangement, the first shift switch 66 is used to generate signals for the front shifting device 38. Preferably, the front shifting device is controlled manually and not automatically. Movement in the front shifting device 38 can be used to select a higher range of gear steps or a lower range of gear steps. Moreover, in the illustrated arrangement, the second shift switch 68 is used to generate signals for the rear shifting device 36. The second shift switch 68 can be used in conjunction with either an automatic mode or a manual mode, as will be described. The second shift switch can be used to step between gear steps on the rear sprocket set 30. Additionally, as will be described, the second shift switch 68 also can be used to step between ranged in an automatic mode.

The illustrated controller 58 also is connected to a pair of switches 76, 78 that are disposed on the housing 54 itself. The first of the pair of switches is a power switch 76 in the illustrated arrangement. The power switch 76 connects and disconnects a power source 77 (i.e., a battery), which can be mounted within the housing 54, to the controller 58 and/or the actuators of the shifting devices 36, 38. The second of the pair of switches is a mode switch 78 that can be used to select an operational mode of the control system. In one arrangement, the mode switch 78 can be used to select between automatic shifting and manual shifting. The various modes of the present invention will be discussed in detail below. The switches 76, 78 preferably are electrically connected to the controller 58. Again, the connections can be any suitable configuration and can include hard-wired and non-hard-wired arrangements.

In the illustrated arrangement, the front and rear shifting devices 36, 38 include a position detector (not shown) that outputs a signal indicative of the location of the derailleur or chain set on the respective sprocket sets 30, 32. The signal is received by the controller 58. Also, the controller 58 can be connected to the display 56 in the illustrated arrangement.

Accordingly, the illustrated controller 58 receives input signals from the speed sensor 60, the position detector (not shown), the shift switches 66, 68, the power switch 76 and the mode switch 78. The data is processed and output signals can be generated that are output to the display 56, the rear shift device 36 and the front shift device 38. With reference to FIG. 1, a connector box 80 is positioned between the controller 58 and the two shifting devices 36, 38. In the illustrated arrangement, a single wire 82 extends between the connector box 80 and the controller 58. The single wire 82 can carry in input data from the position detector and the output data from the controller 58.

The controller 58 also includes a memory device 84 of any suitable type. In the illustrated arrangement, the memory device 84 stores a variety of data related to gear steps and operational speeds. The memory device 84 can be read only or can be read-write in some applications. The read-write type of memory device 84 can be used to track various data, as desired by the operator. The stored data related to gear steps and operation speeds can be in tabular form and can include tables such as those that will be discussed below.

The illustrated transmission features both automatic and manual modes. In manual mode, the operator can select gears in a manner well known to those of skill in the art. In automatic mode, the operator can select ranges of gear steps in accordance with certain features, aspects and advantages in accordance with the present invention. In one arrangement, the ranges of gear steps each comprise at least one gear step than the total number of available gear steps. Preferably, the total number of gear steps is set by the number of gear steps available on a single sprocket set, for instance, such that the resulting gear steps are all on a single sprocket or gear set rather than by combining sprockets (i.e., selecting ratios rather than gear steps) as would be done in a synchronous transmission. This selection of gear steps from a single sprocket or gear set results in an advantageously simple construction and operation. Thus, each of the ranges desirably is a subset of the total number of gear steps available. More desirably, the selected gear steps in each of the ranges are contiguous.

With reference now to the following table, Table 1 an exemplary control system will be described.

TABLE 1

| Shifting Speed | 0–V1 | V1–V2 | V2–Vn-1 | ... | Vn-1–Vn-2 | Vn-2 |
|---|---|---|---|---|---|---|
| Default Selection | 2 | 3 | 4 | ... | n-2 | n-1 |
| Upshift | 3 | 4 | 5 | ... | n-1 | n |
| Downshift | 2 | 3 | 4 | ... | n-2 | n-1 |
| Downshift | 1 | 2 | 3 | ... | n-3 | n-2 |
| Upshift | 2 | 3 | 4 | ... | n-2 | n-1 |
| Upshift | 3 | 4 | 5 | ... | n-1 | n |
| Upshift | 4 | 5 | 6 | ... | n | n |

As illustrated in Table 1, which can be stored in memory, the transmission can include a number of gear steps. In the illustrated arrangement, the transmission includes n gear steps. As the speed of the bicycle increases and decreases, the selected gear step changes. An operator of the bicycle, however, can select the range of gears through which the bicycle transmission operates. For instance, in the illustrated arrangement, the default selection includes gear steps 2 through n-1. In such a selected range, as the bicycle speed increases above V1, the gear step is shifted from 2 to 3. As the bicycle speed increases above V2, the gear step is shifted from 3 to 4. Similarly, as the bicycle speed decreases below V2, the gear step is shifted from 4 to 3.

One aspect of the present invention involves the ability to select the operating range of gears. The ranges of gear steps desirably include a number of gears that is at least one gear step less than the fall range of available gear steps. For instance, in one arrangement, each range of gear steps in a transmission of n gear steps can include n-2 gear steps. In other arrangements, the number of gears steps in any one range can be n-3 or n-4 gear steps.

With continued reference to Table 1, the operator can upshift and downshift in the automatic mode causes an upshift or downshift between differing gear step ranges. The upshift or downshift can be initiated by operating the second shift switch 68 in the illustrated arrangement. For instance, during operation with a strong tailwind, an operator can upshift to a higher gear step range by depressing contact pad 72. As a result of the upshift, gear steps 3 through n would be used rather than 2 through n−1. Of course, during uphill operation, an operator may desire a lower range of gear steps. Accordingly, the operator can downshift to a lower range by depressing contact pad 74. The lower range (after two downshifts in the illustrated arrangement of Table 1) would comprise gear steps 1 through n−2. The selection of the range can be performed incrementally, such as that of the illustrated arrangement. Of course, the arrangement also can be preset to allow jumps of two or more ranges in either direction (i.e., double-upshifting or double-downshifting).

It is anticipated that shifting also can be controlled through a variety of other sensors. For instance, a manual movement of the front shifting device 38 to a lower gearing may be used to indicate that a downshift in gear step range is desired as well. Accordingly, during automatic shifting mode, movement of the front shifting device 38 to a lower gear can be used as a proxy for an downshift and movement of the front shifting device 38 to a higher gear can be used as a proxy for an upshift in the gear step range.

Additionally, a slope sensor (not shown) can be electrically connected to the controller 58. The slope sensor can be used to initiate changes in gear step ranges. For instance, if the slope sensor detects a slope greater than a first preset value, the gear step range may be increased, and if the slope sensor detects a slope less than a second preset value, the gear step range may be decreased. Of course, the first preset value and the second preset value can be the same value in some arrangements.

Moreover, a heart rate monitor or a driving torque sensor can be used to control the selection of shifting ranges. For instance, a target heart rate, such as 150 beats per minute, for instance, can be used to select an appropriate gear range to maintain the operator's heart rate within a target range. Also, the driving torque sensor can be used to decrease the driving torque or increase the driving torque by adjusting the range of gear steps being used. Other sensors and operational controls can also be used.

With reference to the following table, Table 2, a presently preferred arrangement featuring 8 gear steps (i.e., a sixteen speed transmission) is illustrated.

TABLE 2

| Shifting Speed | 0–9 | 9–13 | 13–17 | 17–21 | 21–25 | 25– |
|---|---|---|---|---|---|---|
| Default Selection | 2 | 3 | 4 | 5 | 6 | 7 |
| Upshift | 3 | 4 | 5 | 6 | 7 | 8 |
| Downshift | 2 | 3 | 4 | 5 | 6 | 7 |
| Downshift | 1 | 2 | 3 | 4 | 5 | 6 |
| Upshift | 2 | 3 | 4 | 5 | 6 | 7 |
| Upshift | 3 | 4 | 5 | 6 | 7 | 8 |
| Upshift | 4 | 5 | 6 | 7 | 8 | 8 |

The arrangement illustrated in Table 2 operates in the same manner as the arrangement illustrated in Table 1. The default selection can be any of the gear step ranges. In the illustrated arrangement, shifting occurs at 9 km/hr, 13 km/hr, 17 km/hr, 21 km/hr and 25 km/hr. Thus, for the illustrated arrangement, 8 gear steps have been reduced to a set of ranges features 6 gear steps. The default selection in the illustrated arrangement includes gear steps 2–7 which can be increased or decreased as desired by upshifting or downshifting through the ranges. As the bicycle speed increases above 9 km/hr, the rear shifting device changes the gear step from 2 to 3. If the operator desires an upshift in ranges, the rear shifting device changes the gear step from 3 to 4 while the bicycle is being operated at a speed between 9 km/hr and 13 km/hr. Shifting would continue within the selected range of gear steps until a new range is selected. It should also be noted that while the arrangement of Table 2 results in 6 gear steps being selected from 8 gear steps, it is anticipated that other numbers of gear steps also can be selected, such as 5 gear steps and 7 gear steps, without limitation.

With reference now to the following table, Table 3, a set of cruising mode strategies are illustrated. The illustrated cruising mode strategies can be used in the control system configured and arranged in accordance with certain features, aspects and advantages of the present invention.

TABLE 3

| Front Tooth No. | Gear Step | Rear Tooth No. | Gear Ratio | Auto Mode | | Cruising 1 | | Cruising 2 | |
|---|---|---|---|---|---|---|---|---|---|
| | | | | Min. Speed | Max. Speed | Min. Speed | Max. Speed | Min. Speed | Max. Speed |
| 46 | 1 | 33 | 1.39 | | | | | | |
| 46 | 2 | 29 | 1.59 | 0 | 9 | 0 | 8 | | |
| 46 | 3 | 25 | 1.84 | 9 | 13 | 8 | 12 | 0 | 11 |
| 46 | 4 | 21 | 2.19 | 13 | 17 | 12 | 16 | 11 | 16 |
| 46 | 5 | 17 | 2.71 | 17 | 21 | 16 | 20 | 16 | 21 |
| 46 | 6 | 15 | 3.07 | 21 | 25 | 20 | 24 | 21 | 26 |
| 46 | 7 | 13 | 3.54 | 25 | | 24 | | 26 | |
| 46 | 8 | 11 | 4.18 | | | | | | |
| 34 | 1 | 33 | 1.03 | | | | | | |
| 34 | 2 | 29 | 1.17 | 0 | 9 | 0 | 8 | | |
| 34 | 3 | 25 | 1.36 | 9 | 13 | 8 | 12 | 0 | 11 |
| 34 | 4 | 21 | 1.62 | 13 | 17 | 12 | 16 | 11 | 16 |
| 34 | 5 | 17 | 2 | 17 | 21 | 16 | 20 | 16 | 21 |
| 34 | 6 | 15 | 2.27 | 21 | 25 | 20 | 24 | 21 | 26 |
| 34 | 7 | 13 | 2.62 | 25 | | 24 | | 26 | |
| 34 | 8 | 11 | 3.09 | | | | | | |

With reference now to Table 3, two cruising modes having certain features, aspects and advantages of the present invention will be discussed. The two cruising modes operate in generally the same manner; however, recalibration of the speed ranges (i.e., max. speed and min. speed) differs between the two cruising modes. Also, it should be noted that cruising mode and automatic mode can be operated regardless of the selected front sprocket.

Figure 4:
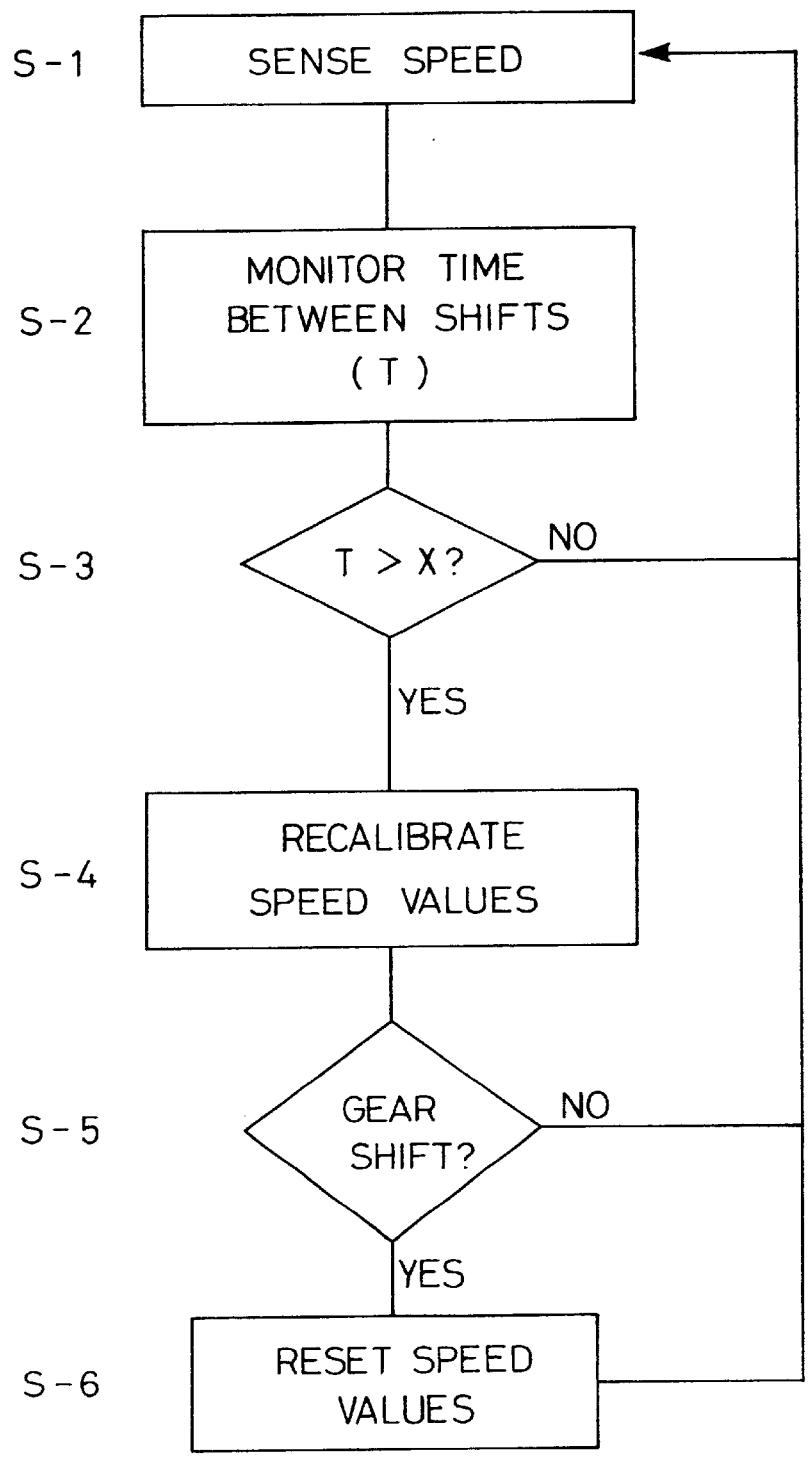
FIG. 4 is a flow diagram for a cruising mode of operation of the automatic shifting control device; and, FIG. 5 is a flow diagram for an elapsed control mode of operation of the automatic shifting control device.

With reference now to FIG. 4, a flow diagram is presented of a general cruising mode which encompasses both of the cruising modes depicted in Table 3. During operation of the bicycle in automatic shifting mode, the speed of the bicycle is monitored (S-1). In the illustrated arrangement, the monitoring of the speed is substantially continuous. In some arrangements, sampling of the speed can be performed at preset time intervals. In addition to the speed being monitored, the time between subsequent shifts is also monitored (S-2). While monitoring the speed and the time are shown in separate blocks in FIG. 4, the two can be monitored simultaneously.

The controller 58 then checks to see whether the time between shifts has exceeded a preset time period (S-3). In the illustrated arrangement, the preset period is approximately 10 seconds. Operation of the bicycle within a single gear step (i.e., between the minimum and maximum speeds for that gear step) can automatically select operation of the bicycle in a cruise mode. The cruise mode advantageously reduces the likelihood that the transmission will automatically shift due to slight variations in bicycle speed. Thus, if the time between shifts exceeds the preset time period, the controller 58 recalibrates the minimum speed, the maximum speed or both (S-4). Preferably, the range defined between the minimum speed and the maximum speed is recentered or expanded in manners that will be described below.

In the illustrated arrangement, a gear shift is used to deactivate the cruise mode. It should be understood that the automatic activation and deactivation can be replaced by manual selection of a cruise mode in some arrangements. The automatic activation and deactivation, however, results in an arrangement that is more user friendly. In addition, deactivation can also be triggered in other manners; however, in the illustrated arrangement, the controller awaits a signal of a gear shift (S-5) before deactivating the cruise mode. Upon deactivation, the controller preferably resets the minimum speeds and the maximum speeds to the preset default speeds (S-6).

With reference again to Table 3, two recalibration techniques will be described in more detail. While two recalibration techniques are described, other techniques also can be used. In the first technique, which is shown in the table under Cruising 1, the range is recentered. Specifically, an average speed for a preset period of time is calculated. In the illustrated arrangement, the preset period of time is the same as preset period of time used to activate the cruising mode (i.e., 10 seconds). The range is then divided in half and half of the range is subtracted from the average speed and half of the range is added to the average speed. This process results in the average speed being substantially centered in the range. It is anticipated that the range also can be readjusted in other manners by using less than half of the range. In the illustrated arrangement of Table 3, if the average speed while in gear step 4 was calculated as 14 km/hr. then the range (i.e., 17 km/hr–13 km/hr=4 km/hr) is divided by 2 (i.e., 4 km/hr/2=2 km/hr) and the range is recentered about 14 km/hr. Thus, the minimum speed for gear step 4 would be 12 km/hr and the maximum speed would be 16 km/hr rather than the default speeds of 13 km/hr and 17 km/hr. Preferably, this recalibration technique is repeated at the end of each preset period of time.

With continued reference to Table 3, in the second recalibration technique, that shown in the table under Cruising 2, the range between the minimum speed and the maximum speed is expanded and the number of gear steps in the range in decreased. Of course, in some arrangements, the number of gear steps will not be altered. In the illustrated arrangement, assuming that the average speed is 18 km/hr while in gear step 5, the range of speeds is widened such that the range is 5 km/hr rather than the default 4 km/hr. Thus, the minimum speed is decreased to 16 km/hr and the maximum speed remains 21 km/hr. This results in the average speed of 18 km/hr being substantially centered within the range. In order to better accommodate the expanding speed ranges, the number of gear steps can be decreased. The illustrated arrangement can be repeated; however, by expanding the ranges, the number of gear step changes would be decreased and the likelihood of undesired shifting is decreased. Thus, when operating in the Cruising 2 mode, recalibration can be performed once or less often than when operating in the Cruising 1 mode.

Figure 5:
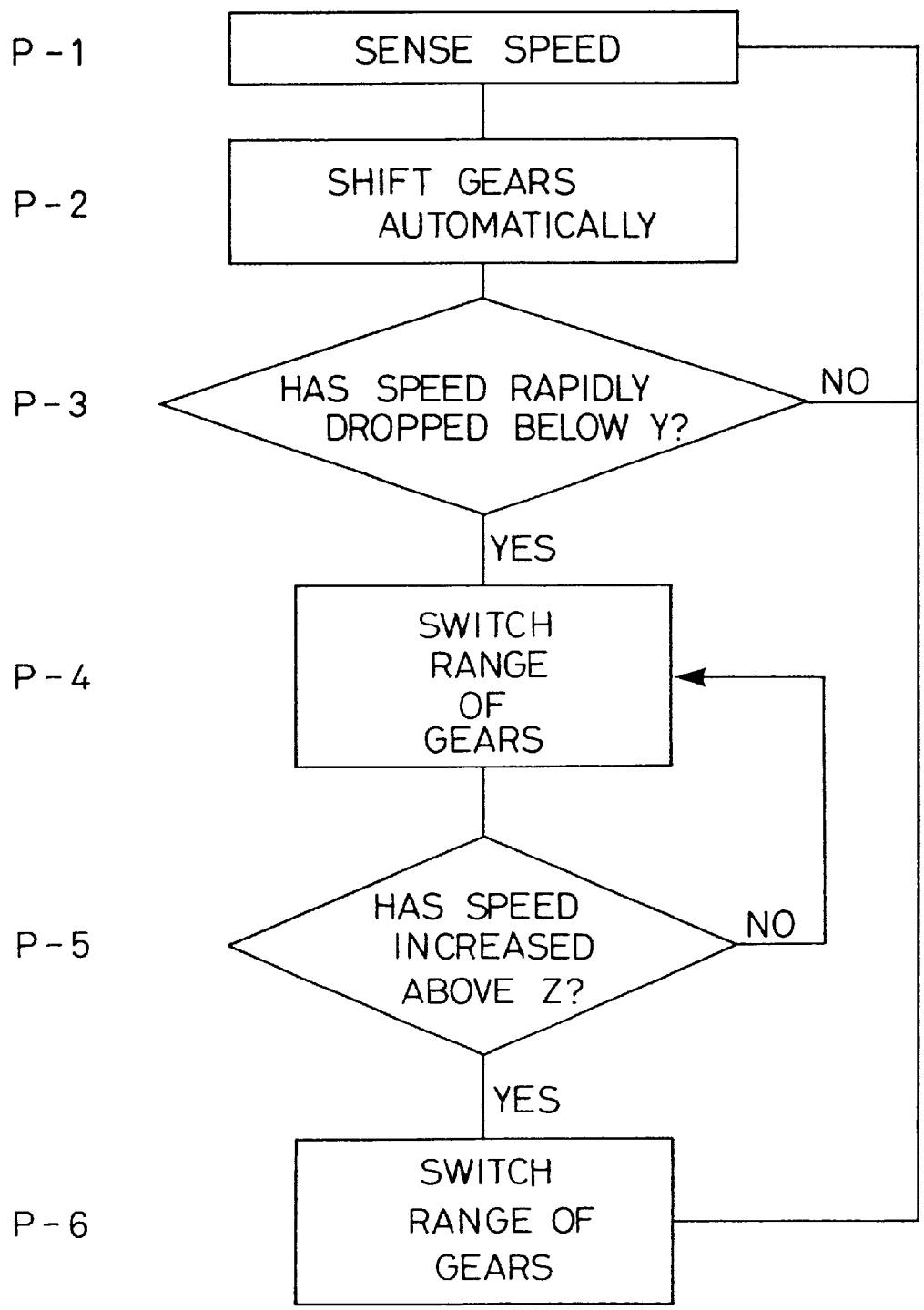

With reference now to Table 4 and FIG. 5, an elapse mode is illustrated therein. The elapse mode can be used during rapid deceleration. For instance, if the bicycle is operating in automatic shifting mode at about 24 km/hr and the speed is rapidly decreased below a threshold speed, then the transmission will be rapidly downshifting through the gear steps in an attempt to change with the bicycle speed. Moreover, if the bicycle comes to an abrupt stop, then the transmission downshift will occurs while the operator is trying to resume operation of the bicycle. Thus, the elapse mode detects such a rapid slowing or stopping of the bicycle and reduces the number of available gear steps. By reducing the number of available gear steps, the transmission will not be downshifting through as many gears and the operator will have better control of the bicycle during resumed operation.

TABLE 4

| Front Tooth No. | Gear Step | Rear Tooth No. | Gear Ratio | Auto Mode | | Elapse Mode | | Auto Mode | |
| --- | --- | --- | --- | --- | --- | --- | --- | --- | --- |
| | | | | Min. Speed | Max. Speed | Min. Speed | Max. Speed | Min. Speed | Max. Speed |
| 46 | 1 | 33 | 1.39 | | | | | | |
| 46 | 2 | 29 | 1.59 | 0 | 9 | | | 0 | 9 |
| 46 | 3 | 25 | 1.84 | 9 | 13 | 0 | 13 | 9 | 13 |
| 46 | 4 | 21 | 2.19 | 13 | 17 | 13 | 17 | 13 | 17 |
| 46 | 5 | 17 | 2.71 | 17 | 21 | 17 | 21 | 17 | 21 |
| 46 | 6 | 15 | 3.07 | 21 | 25 | 21 | 25 | 21 | 25 |
| 46 | 7 | 13 | 3.54 | 25 | | 25 | | 25 | |
| 46 | 8 | 11 | 4.18 | | | | | | |
| 34 | 1 | 33 | 1.03 | | | | | | |
| 34 | 2 | 29 | 1.17 | 0 | 9 | | | 0 | 9 |
| 34 | 3 | 25 | 1.36 | 9 | 13 | 0 | 13 | 9 | 13 |
| 34 | 4 | 21 | 1.62 | 13 | 17 | 13 | 17 | 13 | 17 |

TABLE 4-continued

| | | | | Auto Mode | | Elapse Mode | | Auto Mode | |
|---|---|---|---|---|---|---|---|---|---|
| Front Tooth No. | Gear Step | Rear Tooth No. | Gear Ratio | Min. Speed | Max. Speed | Min. Speed | Max. Speed | Min. Speed | Max. Speed |
| 34 | 5 | 17 | 2 | 17 | 21 | 17 | 21 | 17 | 21 |
| 34 | 6 | 15 | 2.27 | 21 | 25 | 21 | 25 | 21 | 25 |
| 34 | 7 | 13 | 2.62 | 25 | | 25 | | 25 | |
| 34 | 8 | 11 | 3.09 | | | | | | |

With reference to FIG. 5, the controller 58 monitors the speed of the bicycle (P-1) and continues to operate the transmission through the range of gear steps corresponding to the selected gear step range (P-2). When the controller 58 detects that the speed of the bicycle has rapidly decreased below a threshold speed (P-3), the controller 58 enters into an elapsed mode. In the illustrated arrangement of Table 4, the threshold speed Y is the maximum speed of the speed range for the lowest gear step in the active gear step range (i.e., 9 km/hr). It is anticipated that the threshold speed Y can be other speeds; however, the illustrated arrangement effectively removes the lowest gear step from the active gear step range.

In the elapsed mode, the controller changes the selected gear steps of the active gear step range to eliminate at least one of the lower gear steps in the gear step range (P-4). In the illustrated arrangement, the lowest gear step is eliminated by changing the speed range of the second to lowest gear step. The other speed ranges are unaffected. In some arrangements, the lowest gear step can be eliminated and each of the other speed ranges can be adjusted to account for the lower end change.

After adjusting the gear step range, the transmission is operated within the smaller range of gear steps until the bicycle speed again exceeds a threshold speed Z (P-5). While not depicted, operating the transmission in the smaller range of gear steps includes sensing the bicycle speed and automatically shifting gears within the smaller range of gear steps. In the illustrated arrangement, once the speed has exceeded the threshold speed Z, the controller returns the eliminated gear step or steps to the gear step range (P-6). In one arrangement, the threshold speeds Y, Z are the same speed and, in another arrangement, the threshold speeds Y, Z differ.

Although the present invention has been described in terms of a certain embodiment, other embodiments apparent to those of ordinary skill in the art also are within the scope of this invention. Thus, various changes and modifications may be made without departing from the spirit and scope of the invention. For instance, various components may be repositioned as desired and certain steps of the control routines can be rearranged and repositioned. Moreover, not all of the features, aspects and advantages are necessarily required to practice the present invention. Accordingly, the scope of the present invention is intended to be defined only by the claims that follow.

What is claimed is:

1. A method of controlling shifting in a bicycle transmission capable of automatic shifting, said method comprising sensing an operating speed of the bicycle, monitoring a period of time between transmission shifts, determining when a preset period of time between transmission shifts has elapsed and recalibrating an upper speed value and a lower speed value for a gear step currently in use.

2. The method of claim 1 further comprising recalibrating an upper speed value and a lower speed value for all available gear steps when said preset period of time between transmission shifts has elapsed.

3. The method of claim 1 further comprising calculating an average speed for said preset period of time and recalibration comprises altering said upper speed value and said lower speed value such that said average speed is substantially centered between said upper speed value and said lower speed value.

4. The method of claim 1 further comprising calculating a speed difference between said upper speed value and said lower speed value, calculating an average speed for said preset period of time, adding half of the speed difference to said average speed to arrive at a replacement upper speed value and subtracting half of the speed difference from said average speed to arrive at a replacement lower speed value.

5. The method of claim 1, wherein recalibrating said upper speed value and said lower speed value comprises expanding a range defined between said upper speed value and said lower speed value for all available gear steps.

6. The method of claim 5, wherein recalibrating said upper speed value and said lower speed value further comprises reducing a number of available gear steps to accommodate the expansion of ranges for all available gear steps.

7. The method of claim 1, wherein recalibrating said upper speed value and said lower speed value comprises expanding a range defined between said upper speed value and said lower speed value for said gear step currently in use.

8. The method of claim 1, wherein said period of time between transmission shifts is continuously monitored and said recalibrating occurs after every preset period time has elapsed.

9. The method of claim 1, wherein said recalibrating is canceled by a gear shift.

10. The method of claim 9 further comprising resetting said upper speed value and said lower speed value upon detection of a gear shift.

11. A method of controlling shifting in a bicycle transmission capable of automatic shifting, said method comprising sensing an operating speed of the bicycle, automatically changing gears within a first preset range of gear steps depending upon said operating speed of the bicycle, determining if said operating speed is rapidly reduced below a first threshold operating speed, switching to a second preset range of gear steps when said operating speed is rapidly reduced below said first threshold operating speed, automatically changing gears within said second preset range of gear steps depending upon said operating speed of the bicycle, and said first preset range of gear steps comprising more gear steps than said second preset range of gear steps.

12. The method of claim 11 further comprising automatically changing gears within said first preset range of gear speeds when said operating speed returns above a second threshold operating speed.

13. The method of claim 12, wherein said first threshold operating speed and said second threshold operating speed are the same operating speed.

14. The method of claim 13, wherein said first threshold operating speed is an upper operating speed for a lowermost gear step of said first preset range of gear steps.

15. A method of controlling shifting in a bicycle transmission capable of automatic shifting, said method comprising selecting an automatic operating mode, selecting a first preset range of gear steps from a plurality of preset ranges of gear steps, and operating said bicycle transmission among said selected preset range of gear steps.

16. The method of claim 15 further comprising selecting a second preset range of gear steps from said plurality of preset ranges of gear steps.

17. The method of claim 16, wherein said selecting said second preset range of gear steps comprises detecting an output from a slope sensor to determine if a surface over which the bicycle is being operated slopes upward or downward.

18. The method of claim 16, wherein said selecting said second preset range of gear steps comprises detecting a position change in a front derailleur.

19. The method of claim 16, wherein said selecting said second preset range of gear steps comprises detecting a heart rate of an operator to determine if said detected heart rate exceeds a preset target heart rate.

20. The method of claim 16, wherein said selecting said second preset range of gear steps comprises detecting a driving torque upon a crank of said bicycle to determine if said driving torque exceeds a preset driving torque.

21. The method of claim 16, wherein said selecting said second preset range of gear steps comprises detecting movement of a first switch.

22. The method of claim 21, wherein said plurality of preset ranges of gear steps are incrementally related such that detecting movement of said first switch in a first direction selects said second preset range of gear steps to be incrementally one range higher than said first preset range of gear steps and such that detecting movement of said switch in a second direction selects said second preset range of gear steps to be incrementally one range lower than said first preset range of gear steps.

* * * * *